(12) United States Patent
Zhang et al.

(10) Patent No.: US 11,613,234 B1
(45) Date of Patent: Mar. 28, 2023

(54) SYSTEM AND METHOD OF AUTOMATICALLY ACTIVATING WINDSHIELD WIPER OF A VEHICLE

(71) Applicant: GM Global Technology Operations LLC, Detroit, MI (US)

(72) Inventors: Yubiao Zhang, Sterling Heights, MI (US); Qingrong Zhao, Troy, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/568,905

(22) Filed: Jan. 5, 2022

(51) Int. Cl.
*B60W 40/09* (2012.01)
*B60W 50/14* (2020.01)
*B60S 1/08* (2006.01)
*G06V 20/56* (2022.01)

(52) U.S. Cl.
CPC ........... *B60S 1/0844* (2013.01); *B60S 1/0859* (2013.01); *G06V 20/56* (2022.01)

(58) Field of Classification Search
None
See application file for complete search history.

(56) References Cited

U.S. PATENT DOCUMENTS

| 2021/0061228 | A1* | 3/2021 | Maharshi | B60R 11/04 |
| 2021/0082090 | A1* | 3/2021 | Herman | G06T 5/008 |

* cited by examiner

*Primary Examiner* — Samuel D Fereja
(74) *Attorney, Agent, or Firm* — Vivacqua Crane PLLC

(57) ABSTRACT

A system and method of automatically activating a windshield wiper system of a vehicle having a front windshield with a front wiper and a rear windshield with a rear wiper are provided. The method comprises assessing at least one windshield classification of road conditions based on original information and capturing a front image of the front windshield, a rear image of the rear windshield, and an environment image of the environment. The method further comprises classifying the images to define a first windshield class. The method further comprises determining a front windshield perception, a rear windshield perception, and an environment perception of the first windshield class to define a first combination of detection sources. The method further comprises fusing the front windshield perception, the rear windshield perception and the environment perception, defining a first front probability of the first windshield class. The method further comprises activating the front wiper when the first front probability is greater than a front threshold.

20 Claims, 2 Drawing Sheets

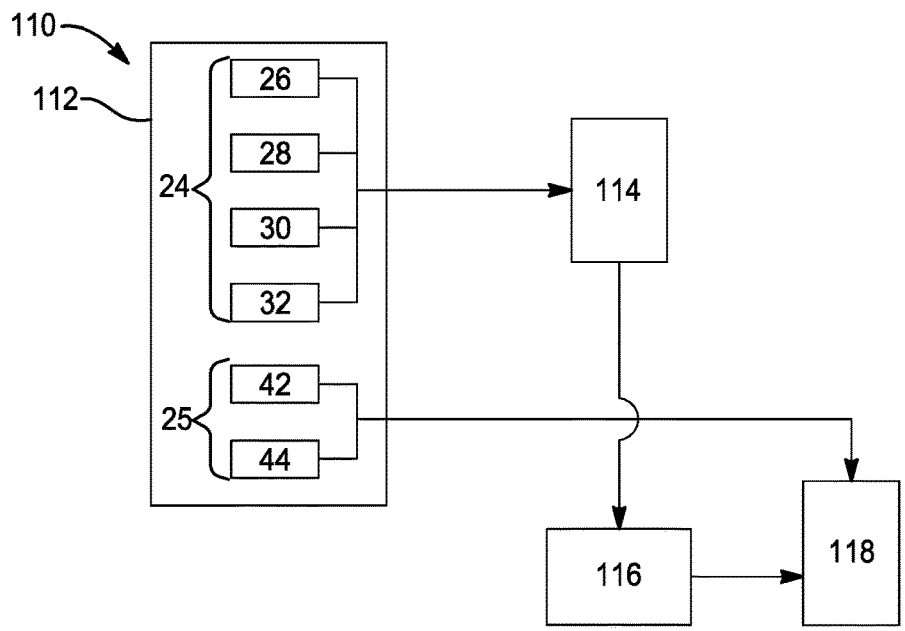
FIG. 2
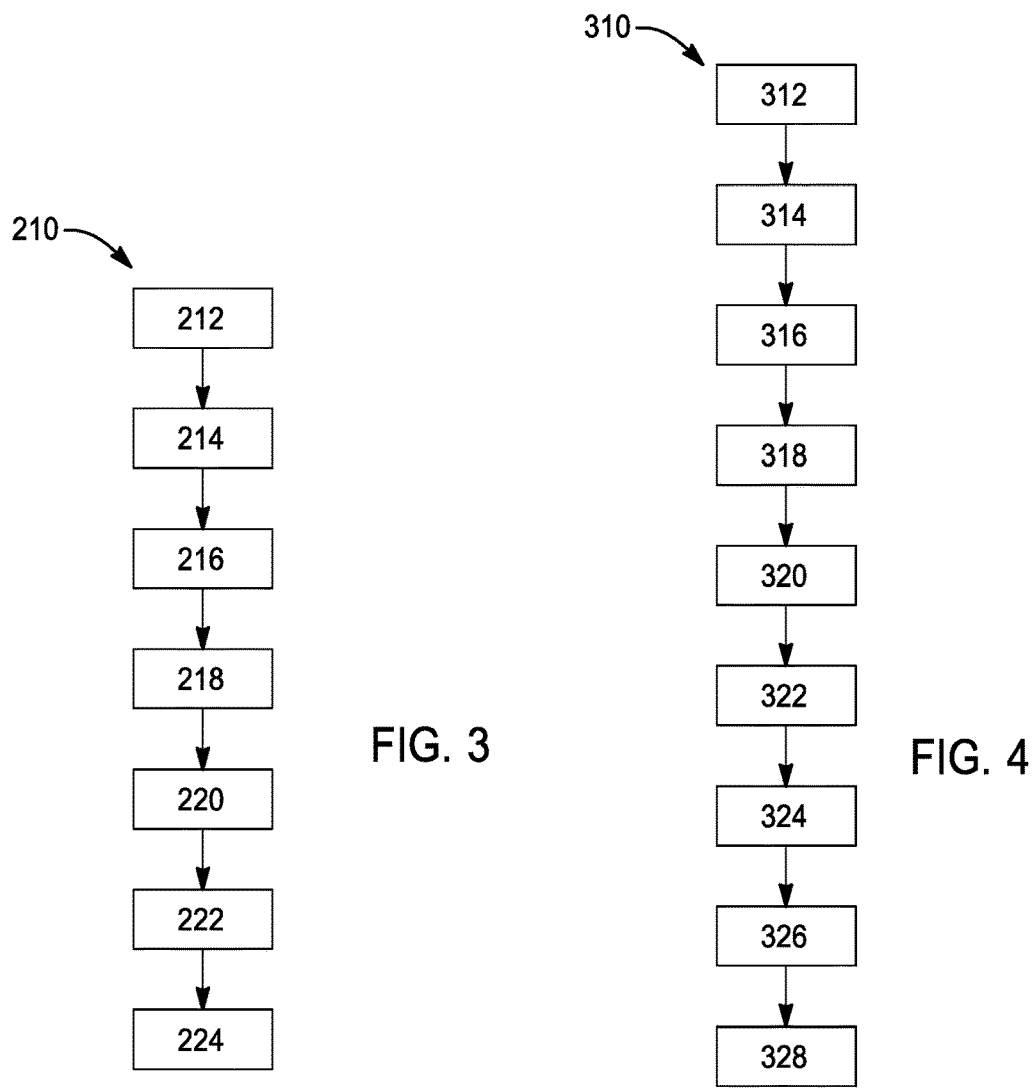
FIG. 3
FIG. 4

SYSTEM AND METHOD OF AUTOMATICALLY ACTIVATING WINDSHIELD WIPER OF A VEHICLE

INTRODUCTION

The present disclosure relates to windshield wiper sensors and more particularly systems and methods of automatically activating a windshield wiper of a vehicle.

Currently rain sensors add an undesirable cost to a vehicle in which it is installed. Moreover, many vehicles with rain sensors have sensors for the front windshield only and are configured only for rain detection. Many of such sensors have low resolution and low reliability. Furthermore, many current vehicles with rain sensors have windshield wipers with inconsistent speed.

SUMMARY

Thus, while current windshield wiper systems achieve their intended purpose, there is a need for a new and improved system and method for automatically activating a windshield wiper system of a vehicle.

In accordance with one aspect of the present disclosure, a method of automatically activating a windshield wiper system of a vehicle having a front windshield with a front wiper and a rear windshield with a rear wiper is provided. The method comprises providing original information for condition assessment and assessing at least one windshield classification of road conditions with a condition assessment module based on the original information. In this aspect, the method further comprises capturing a front image of the front windshield, a rear image of the rear windshield, and an environment image of the environment. The method then comprises classifying the front image, the rear image, and the environment image to the at least one windshield classification with a conditional windshield perception module defining a first windshield class. The method further comprises determining a front windshield perception, a rear windshield perception, and an environment perception of the first windshield class with the Conditional windshield perception module to define a first combination of detection sources.

In this aspect of the present disclosure, the method comprises fusing the front windshield perception, the rear windshield perception and the environment perception of the first combination of detection sources with a weighted voting module to define a first front probability of the first windshield class. The method then comprises activating the front wiper when one of the first front probability is greater than a front threshold and the first front probability is greatest in magnitude of the at least one classification.

In one example, the original information comprises interior vehicle temperature, exterior vehicle temperature, local weather information, geographic climate, global positioning system (GPS) information of the vehicle for condition assessment. In another example, the at least one windshield classification is a road condition that may initiate activation of one of the front wiper and the rear wiper of the vehicle.

In another example of this aspect, the weighted voting module comprises a first equation as:

$$P(X)\_front\_fusion = w1*P(X)\_front + w2*P(X)\_rear + w3*P(X)\_road.$$

P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

In yet another example, the method further comprises estimating a first front intensity of the first windshield class with the Conditional windshield perception module. Moreover, the method comprises determining the first front intensity of the first windshield class. The first front intensity is based on drop rate within an area of the front windshield. Furthermore, the method comprises adjusting a speed of the front wiper based on the first front intensity when the front wiper is activated.

In still another example, the step of determining the first front intensity comprises applying a linear fitting equation as:

$$In(drop) = k1*V\_drop + k2*N\_drop,$$

where In (drop) is normalized intensity, V_drop is drop rate, N_drop is the number of drops per area, and k1 and k2 are calibrated coefficients.

In one example, the method further comprises fusing the front windshield perception, the rear windshield perception and the environment perception of the first combination of detection sources with the weighted voting module to define a first rear probability of the first windshield class. Then, the method comprises activating the rear wiper when one of the first rear probability is greater than a rear threshold and the first rear probability is greatest in magnitude of the at least one classification.

In another example, the weighted voting module comprises a second equation as:

$$P(X)\_rear\_fusion = w1*P(X)\_front + w2*P(X)\_rear + w3*P(X)\_road.$$

P(X)_rear_fusion is the first rear probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

In another example, the method further comprises estimating a first rear intensity of the first windshield class with the Conditional windshield perception module and determining the first rear intensity of the first windshield class. The first rear intensity is based on drop rate within an area of the rear windshield. The method further comprises adjusting a speed of the rear wiper based on the first rear intensity when the rear wiper is activated.

In one example, the step of determining the first rear intensity comprises applying a linear fitting equation as:

$$In(drop) = k1*V\_drop + k2*N\_drop$$

where In (drop) is normalized intensity, V_drop is drop rate, N_drop is the number of drops per area of the rear windshield, and k1 and k2 are calibrated coefficients.

In accordance with another aspect of the present disclosure, a system of automatically activating a windshield wiper of a vehicle comprising a front windshield having a front wiper and a rear windshield having a rear wiper is provided. In this aspect, the system comprises a cloud server disposed remotely from the vehicle. The cloud server is arranged to provide original information for condition assessment. The system further comprises at least one sensor disposed on the vehicle and arranged to capture a front image of the front windshield, a rear image of the rear windshield, and an environment image of the environment. Moreover, the system comprises an electronic control unit (ECU) disposed in the vehicle. The ECU is in communication with the cloud server and the at least one sensor.

In this aspect, the ECU comprises a condition assessment module arranged to assess at least one windshield classification of road conditions based on the original information.

The ECU further comprises a conditional windshield perception module arranged to classify the front image, the rear image, and the environment image to the at least one windshield classification defining a first windshield class. Moreover, the Conditional windshield perception module is arranged to determine a front windshield perception, a rear windshield perception, and an environment perception of the first windshield class defining a first combination of detection sources.

In this aspect, the ECU further comprises a weighted voting module arranged to fuse the front windshield perception, the rear windshield perception and the environment perception of the first combination of detection sources, defining a first front probability of the first windshield class.

Furthermore, the ECU comprises an activation module arranged to activate the front wiper when one of the first front probability is greater than a front threshold and the first front probability is greatest in magnitude of the at least one windshield classification.

In one embodiment, the original information comprises interior vehicle temperature, exterior vehicle temperature, local weather information, geographic climate, global positioning system (GPS) information of the vehicle for condition assessment.

In another embodiment, the weighted voting module comprises a first equation as $$P(X)\_front\_fusion = w1*P(X)\_front + w2*P(X)\_rear + w3*P(X)\_road,$$

where P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

In yet another embodiment, the Conditional windshield perception module is arranged to estimate a first front intensity of the first windshield class. Moreover, the ECU is arranged to determine the first front intensity of the first windshield class. The first front intensity is based on drop rate within an area of the front windshield. Furthermore, the ECU is arranged to adjust a speed of the front wiper based on the first front intensity when the front wiper is activated.

In still another embodiment, the ECU is arranged to determine the first front intensity by applying a linear fitting equation as:

$$\ln(\text{drop}) = k1*V\_drop + k2*N\_drop$$

where ln (drop) is normalized intensity, V_drop is drop rate, N_drop is the number of drops per area, and k1 and k2 are calibrated coefficients.

In another embodiment, the weighted voting module is arranged to fuse the front windshield perception, the rear windshield perception and the environment perception of the first combination of detection sources to define a first rear probability of the first windshield class. Moreover, the activation module is arranged to activate the rear wiper when one of the first rear probability is greater than a rear threshold and the first rear probability is greatest in magnitude of the at least one classification.

In yet another embodiment, the weighted voting module comprises a second equation as:

$$P(X)\_rear\_fusion = w1*P(X)\_front + w2*P(X)\_rear + w3*P(X)\_road,$$

where P(X)_rear_fusion is the first rear probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

In yet another embodiment, the Conditional windshield perception module is arranged to estimate a first rear intensity of the first windshield class. Moreover, the ECU is arranged to determine the first rear intensity of the first windshield class, the first rear intensity being based on drop rate within an area of the rear windshield. Additionally, the ECU is arranged to adjust a speed of the rear wiper based on the first rear intensity when the rear wiper is activated.

In another embodiment, the ECU is arranged to determine the first rear intensity by applying a linear fitting equation as:

$$\ln(\text{drop}) = k1*V\_drop + k2*N\_drop$$

where ln (drop) is normalized intensity, V_drop is drop rate, N_drop is the number of drops per area of the rear windshield, and k1 and k2 are calibrated coefficients.

In accordance with another aspect of the present disclosure, a method of automatically activating a windshield wiper system of a vehicle having a front windshield with a front wiper and a rear windshield with a rear wiper is provided. The method comprises providing original information for condition assessment and assessing at least one windshield classification of road conditions with a condition assessment module based on the original information. The method further comprises capturing a front image of the front windshield, a rear image of the rear windshield, and an environment image of the environment. Moreover, the method further comprises classifying the front image, the rear image, and the environment image to the at least one windshield classification with a conditional windshield perception module defining a first windshield class.

In this aspect, the method further comprises determining a front windshield perception, a rear windshield perception, and an environment perception of the first windshield class with the Conditional windshield perception module to define a first combination of detection sources. The method further comprises fusing the first combination of detection sources with a weighted voting module with respect to the front windshield perception, the rear windshield perception and the environment perception, defining a first front probability of the first windshield class.

In this aspect, the weighted voting module comprising a first equation as:

$$P(X)\_front\_fusion = w1*P(X)\_front + w2*P(X)\_rear + w3*P(X)\_road,$$

where P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

The method further comprises fusing the front windshield perception, the rear windshield perception and the environment perception of the first combination of detection sources with the weighted voting module to defining a first rear probability of the first windshield class. The weighted voting module comprising a second equation as:

$$P(X)\_rear\_fusion = w1*P(X)\_front + w2*P(X)\_rear + w3*P(X)\_road,$$

where P(X)_rear_fusion is the first rear probability of the first windshield class (X).

Additionally, the method further comprises activating the front wiper when one of the first front probability is greater than a front threshold and the first front probability is greatest in magnitude of the at least one classification. Furthermore, the method further comprises activating the rear wiper when one of the first rear probability is greater than a rear threshold and the first rear probability is greatest in magnitude of the at least one classification.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a flowchart of a general method of automatically activating a windshield wiper for the system in FIG. 1.

FIG. 3 is a flowchart of a method of automatically activating a windshield wiper for the system of FIG. 1 in accordance with one example of the present disclosure.

FIG. 4 is a flowchart of a method of automatically activating a windshield wiper for the system of FIG. 1 in accordance with another example of the present disclosure.

DETAILED DESCRIPTION

Figure 1:
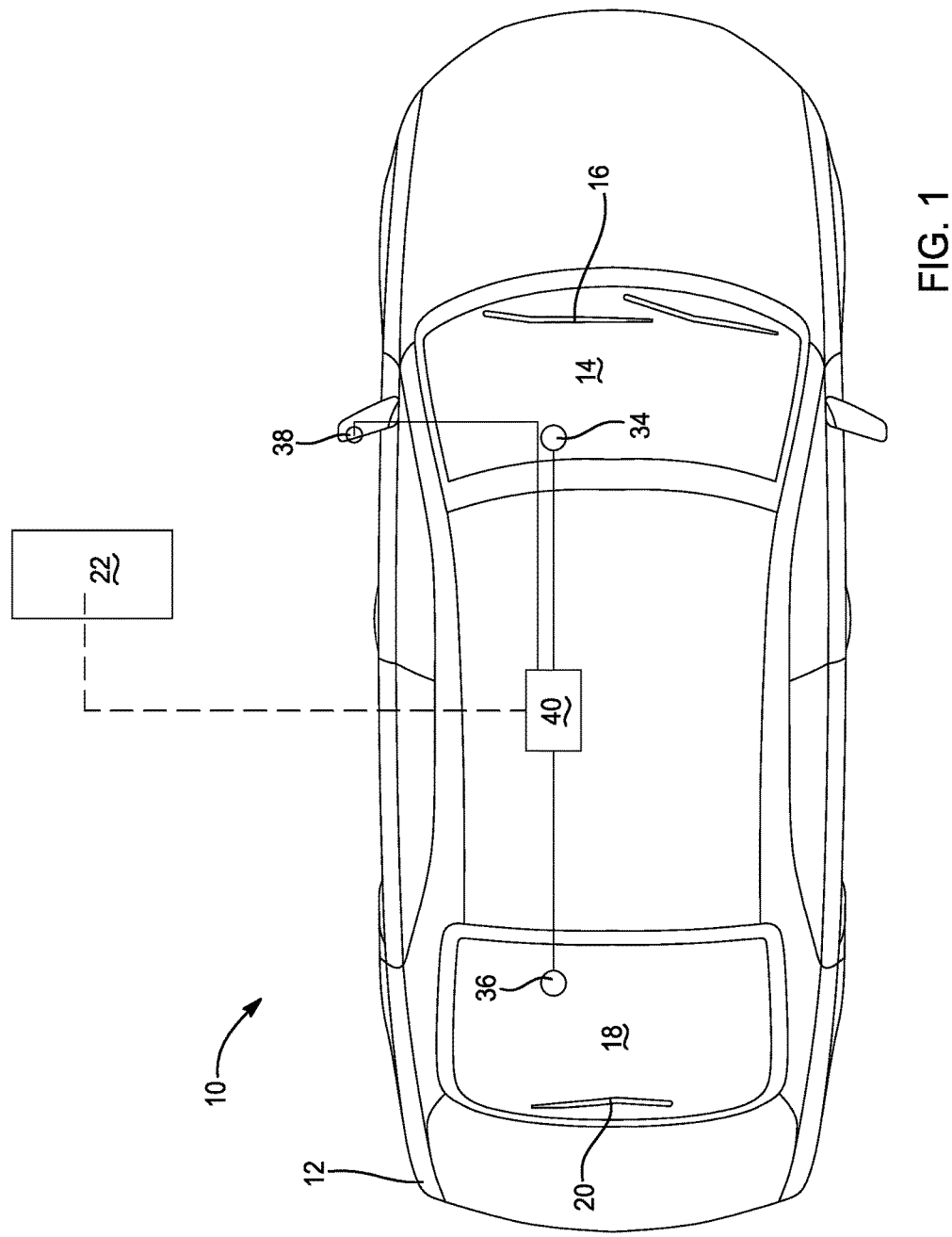
FIG. 1 is a schematic view of a system for automatically activating a windshield wiper of a vehicle comprising a front windshield having a front wiper and a rear windshield having a rear wiper in accordance with one embodiment of the present disclosure.

The following description is merely exemplary in nature and is not intended to limit the present disclosure, application, or uses.

Embodiments and examples of the present disclosure provide systems and methods of automatically activating a windshield wiper of a vehicle. The embodiments and examples are more efficient, more accurate, and more cost effective systems and methods. Implementation of such embodiments and examples typically will not require new hardware on most existing vehicles and will not require any additional hardware on new vehicles.

FIG. 1 depicts a system 10 for automatically activating a windshield wiper of a vehicle 12 comprising a front windshield 14 having a front wiper 16 and a rear windshield 18 having a rear wiper 20 in accordance with one embodiment of the present disclosure. As shown, the system 10 comprises a cloud server 22 disposed remotely from the vehicle 12. The cloud server 22 is arranged to provide original information 24 (FIG. 2) for condition assessment and processed information 25. In one embodiment, the original information 24 comprises interior and exterior vehicle temperatures 26, local weather information 28, geographic climate 30, global positioning system (GPS) information 32 of the vehicle for condition assessment. The processed information 25 comprises vehicle to vehicle (V2V) and/or vehicle to infrastructure (V2X) information 42 and detected road condition information 44 for system arbitration and decision making as described below. Other available information may be included without departing from the spirit or scope of the present disclosure.

The system 10 further comprises at least one sensor, here a front sensor 34 and a rear sensor 36, disposed in the vehicle 12 and arranged to capture a front image of the front windshield 14, a rear image of the rear windshield 18, and an environment image of the environment. Moreover, the system 10 comprises a temperature sensor 38 disposed on the vehicle for detecting exterior and interior temperature. As illustrated in FIG. 1, the front sensor 34 is preferably disposed adjacent the front windshield 14 of the vehicle 12 for front windshield detection and road detection. Moreover, the rear sensor 36 is preferably adjacent the rear windshield 18 of the vehicle 12 for rear windshield detection and road detection. Each of the front sensor 34 and the rear sensor 36 may be any suitable sensor having a camera arranged to capture still and/or motion images without departing from the spirit or scope of the present disclosure.

Moreover, the system 10 comprises an electronic control unit (ECU) 40 disposed in the vehicle 12. As shown, the ECU 40 is in communication with the cloud server 22 and the front and rear sensor 36s 34, 36. As discussed in greater detail below, the ECU 40 transmits and receives signals to and from each of the sensors and the cloud server 22. It is to be understood that the ECU 40 comprises modules and algorithms to assist in controlling the system.

In this embodiment, the ECU 40 comprises a condition assessment module arranged to assess at least one windshield classification of road conditions based on the original information 24. As will be described in greater detail below, the condition assessment module pre-assesses the windshield conditions and determines what types of conditions to be detected. For example, some types of conditions may include wet, dry, rain, snow, sleet, ice, hail, or any other suitable condition without departing from the spirit or scope of the present disclosure. Moreover, based on available original information 24 (e.g., interior and exterior vehicle temperatures 26, local weather information 28, geographic climate 30, GPS information), a list of possible conditions may be narrowed. Thus, based on the geographic climate 30 and local weather of the vehicle, the condition assessment module may determine a set of rules (e.g., "if then" rules) for narrowing the list of possible conditions to be assessed, detected, or classified. As a result, some windshield conditions may be isolated thereby saving computation and enhancing accuracy.

As an example, if the external temperature is greater than temperature T1, then only a possibility of rain and non-rain conditions are assessed and thus sleet, ice, and snow conditions will not be detected. If the external temperature is between temperatures T1 and T2, then only a possibility of sleet and rain conditions are assessed and ice/snow conditions will not be detected. If the external temperature is below temperature T1, then all possible conditions are assessed and detected. It is to be understood that any other rules may be set for any other available original information 24, such as geographic climate 30, without departing from the spirit or scope of the present disclosure. By isolating windshield conditions or narrowing the list of possible condition, computation workload is reduced resulting in enhanced system efficiency and accuracy.

In this embodiment, the ECU 40 further comprises a conditional windshield perception (CWP) module arranged to classify the front image, the rear image, and the environment image to the at least one windshield classification defining a first windshield class (e.g., rain). Moreover, the CWP module is arranged to determine a front windshield perception, a rear windshield perception, and an environment perception of the first windshield class defining a first combination of detection sources.

The conditional windshield perception (CWP) module preferably includes two functions, a camera based front windshield perception function and camera based rear windshield perception function. In this example, the CWP module generates three results: first, the front windshield perception and, second, a rear windshield perception which are two elements in the first combination of detection source. A third result that the CWP module may generate is the environment perception based on the original information 24 described below. Each function includes a windshield perception algorithm which learns patterns of defined windshield conditions and identifies a windshield condition along with a confidence level (probability) in real time. The windshield perception algorithm is generally machine learning (ML) based. Thus, the CWP module preferably comprises a ML model to assist in classifying and determining the front windshield perception, the rear windshield perception, and the environment perception of the first windshield class defining the first combination of detection sources.

Preferably, the ML model is arranged to learn patterns of each defined windshield condition first by training large sets of labeled images (e.g., clear windshield images, rain windshield images, dust windshield images, snow-covered windshield images). Once the training process is complete, the ML model learns the patterns and can be used to identify a windshield condition when a new windshield camera image is captured and fed into the ML model. The ML model will classify the windshield condition to one of the defined classification (e.g., clear, dust, rain, snow).

In one example, the windshield perception algorithm comprises a conventional image analysis and ML combined approach. In this example, conventional image analysis techniques are used to extract prominent image features which can represent patterns of windshield conditions, and use a ML method, e.g., Support Vector Machine (SVM) to classify a windshield condition.

In another example, the windshield perception algorithm comprises a convolutional neural network (CNN) based approach. The CNN is used to let the machine automatically extract prominent image features and classify a windshield condition. It is to be understood that other approaches may be used to classify a windshield condition without departing from the spirit or scope of the present disclosure.

In this embodiment, the first combination of detection sources comprises the environment perception of the first windshield class (discussed above). Preferably, the environment perception is determined by the windshield perception algorithm based on the original information 24 thereby defining the third function/result which the CWP module generates.

Additionally, the CWP module is arranged to estimate a first front intensity of the first windshield class. Furthermore, the CWP module is arranged to estimate a first rear intensity of the first windshield class. Each of the first front intensity and the first rear intensity may be determined by algorithmic models based on drop rate within an area of a windshield.

Moreover, the ECU 40 further comprises a weighted voting module arranged to fuse the front windshield perception, the rear windshield perception and the environment perception of the first combination of detection sources. The fusion of the front windshield perception, the rear windshield perception and the environment perception defines a first front probability of the first windshield class.

In one example of fusing to define the first front probability, the weighted voting module comprises a first equation as $$P(X)\_front\_fusion = w1*P(X)\_front + w2*P(X)\_rear + w3*P(X)\_road,$$

where $P(X)\_front\_fusion$ is the first front probability of the first windshield class (X), $P(X)\_front$ is the front windshield perception, $P(X)\_rear$ is the rear windshield perception, $P(X)\_road$ is the environment perception, and w1, w2, and w3 are weight of detection sources of the front windshield perception, the rear windshield perception, and the environment perception, respectively. The magnitudes of w1, w2, and w3 are calibrated and may vary based on the environment perception generated by the CWP module.

For example, a first windshield class (rain) includes a front windshield perception of 0.92, a rear windshield perception of 0.9, and an environment perception of 0.91, and if $P(X)\_road > 85\%$, then w1=1 w2=0 w3=0 (thereby emphasizing the front windshield perception);

if $P(X)\_road \in [60\%\ 85\%]$, then w1=0.9 w2=0.05 w3=0.0.5 (thereby scaling down the confidence or probability of the front windshield perception); and if $P(X)\_road < 60\%$, then w1=0.8 w2=0 w3=0.2 (thereby scaling down further the confidence of the front windshield perception).

Then, when $P(X)\_road > 85\%$, the first front probability can be calculated as follows:

$$P(rain)\_front\_fusion = w1*P(rain)\_front + w2*P(rain)\_rear + w3*P(rain)\_road = 1*0.92 + 0*0.9 + 0*0.91 = 0.92.$$

Moreover, the weighted voting module is arranged to fuse the front windshield perception, the rear windshield perception, and the environment perception of the first combination of detection sources. The fusion of the front windshield perception, the rear windshield perception, and the environment perception defines a first rear probability of the first windshield class.

In one example of fusing to define the first rear probability, the weighted voting module comprises a second equation as:

$$P(X)\_rear\_fusion = w1*P(X)\_front + w2*P(X)\_rear + w3*P(X)\_road,$$

where $P(X)\_rear\_fusion$ is the first rear probability of the first windshield class (X), $P(X)\_front$ is the front windshield perception, $P(X)\_rear$ is the rear windshield perception, $P(X)\_road$ is the environment perception, and w1, w2, and w3 are weight of detection sources of the front windshield perception, the rear windshield perception, and the environment perception, respectively. As demonstrated above, the magnitudes of w1, w2, and w3 are calibrated and may vary based on the environment perception generated by the CWP module or from the processed information 25. As also demonstrated, the first rear probability can be calculated in the same matter as the first front probability is shown to be calculated.

The processed information 25 comprises V2V and/or V2X information 42 and road condition information 44. It is understood that V2V information comprises environment information received and transmitted between vehicles as known in the art. Moreover, it is understood that V2X information comprises environment information received and transmitted between an infrastructure and vehicles as known in the art. Furthermore, it is understood that road condition information 44 comprises road condition information from web-based sources such as the internet.

Moreover, the ECU 40 is arranged to determine the first front intensity and the first rear intensity of the first windshield class. The first front intensity is based on drop rate within an area of the front windshield 14. Moreover, the first rear intensity is based on drop rate within an area of the rear windshield 18. In one example, the ECU 40 is arranged to determine each of the first front intensity and the first rear intensity by applying a linear fitting equation as:

$$In(drop) = k1 * V\_drop + k2 * N\_drop$$

where In (drop) is normalized intensity, V_drop is drop rate, N_drop is the number of drops per area of the windshield, and k1 and k2 are calibrated coefficients.

Additionally, the ECU 40 comprises an activation module arranged to activate the front wiper 16 16 when the first front probability is greater than a front threshold. Alternatively, the activation module is arranged to activate the front wiper 16 16 when the first front probability is greatest in magnitude of the at least one windshield classification. Moreover, the activation module is arranged to activate the rear wiper 20 when the first rear probability is greater than a rear threshold. Alternatively, the activation module is arranged to activate the rear wiper 20 when the first rear probability is greatest in magnitude of the at least one classification.

Furthermore, the ECU 40 is arranged to adjust a speed of the front wiper 16 16 based on the first front intensity when the front wiper 16 16 is activated. Additionally, the ECU 40 is arranged to adjust a speed of the rear wiper 20 based on the first rear intensity when the rear wiper 20 is activated. The speed of the front wiper 16 16 and rear wiper 20 may be adjusted by way of any suitable manner such as a rule-based algorithm based on the respective intensity without departing from the scope or spirit of the present disclosure.

FIG. 2 shows a flowchart of a general method 110 of automatically activating a windshield wiper for the system 10 in FIG. 1 in accordance with one example of the present disclosure. As shown, the method 110 comprises a step 112 of providing existing information (interior and exterior vehicle temperatures 26, local weather information 28, geographic climate 30, global positioning system (GPS) information 32 of the vehicle for condition assessment), a step 114 of condition assessment, a step 116 of conditional windshield perception (CWP), and a step 118 of arbitration and decision making. As will be described in greater detail below, the step 114 of condition assessment pre-assesses windshield conditions and determines what types of conditions to be detected. As a result, some conditions may be isolated for a reduced computation workload, increased efficiency, and enhanced accuracy.

Moreover, the step 116 of conditional windshield perception may focus on visual images of the front windshield 14 and rear windshield 18 of the vehicle 12 based on an output of the step 114 of condition assessment (above). Machine learning models may be used to determine probability of windshield conditions and classes. Furthermore, the step 118 of arbitration and decision making determines whether the front wiper 16 and/or the rear wiper 20 may be activated based on an output from the step of CWP and results from a weighted voting module. Speed of the wipers may also be determined and adjusted based on probability of windshield condition.

FIG. 3 depicts a flowchart of a method 210 of automatically activating a windshield wiper implemented by the system 10 of FIG. 1 in accordance with one example of the present disclosure. In this example, the method 210 automatically activates a windshield wiper of a vehicle 12 having a front windshield 14 with a front wiper 16 and a rear windshield 18 with a rear wiper 20. As shown, the method 210 comprises a step 112 of providing original information 24 for condition assessment. As discussed above, the cloud server 22 provides the original information 24 which comprises interior and exterior vehicle temperatures 26, local weather information 28, geographic climate 30, global positioning system (GPS) information 32 of the vehicle for condition assessment.

As depicted, the method 210 further comprises a step 214 of assessing at least one windshield classification of road conditions with the conditional assessment module of the ECU 40 based on the original information 24. The condition assessment module pre-assesses the windshield conditions and determines what types of conditions to be detected.

Moreover, the method 210 further comprises a step 216 of capturing a front image of the front windshield 14, a rear image of the rear windshield 18, and an environment image of the environment. The at least one sensor, here the front sensor 34 and the rear sensor 36 (FIG. 1), preferably capture the images and sends image signals accordingly to the ECU 40 for processing.

Referring to FIG. 2, the method 210 then comprises a step 218 of the ECU 40 classifying the front image, the rear image, and the environment image to the at least one windshield classification with ML as discussed above. The method 210 further comprises a step 220 of determining a front windshield perception, a rear windshield perception, and an environment perception of the first windshield class with the CWP module of the ECU 40 (FIG. 1) to define a first combination of detection sources with ML as discussed above. As mentioned, the CWP module of the ECU 40 (FIG. 1) is arranged to determine via ML the front windshield perception, the rear windshield perception, and the environment perception of the first windshield class, defining the first combination of detection sources.

In one example, the method 210 may comprise estimating a first front intensity of the first windshield class with the conditional windshield perception module. As mentioned, the CWP module is arranged to estimate the first front intensity of the first windshield class. The first front intensity may be estimated by algorithmic models based on drop rate within an area of a windshield.

In this aspect of the present disclosure, the method 210 comprises a step 222 of fusing the front windshield perception, the rear windshield perception and the environment perception of the first combination of detection sources. As previously discussed, the weighted voting module is arranged to fuse the front windshield perception, the rear windshield perception, and the environment perception to define a first front probability of the first windshield class.

As detailed above, one example of fusing to define the first front probability is by way of the weighted voting module. As discussed, the weighted voting module comprises a first equation as:

$$P(X)\_front\_fusion = w1 * P(X)\_front + w2 * P(X)\_rear + w3 * P(X)\_road,$$

where P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively. The magnitudes of w1, w2, and w3 are calibrated and may vary based on the environment perception generated by the CWP module.

For example, a first windshield class (rain) includes a front windshield perception of 0.92, a rear windshield perception of 0.9, and an environment perception of 0.91, and If P(X)_road>85%, then w1=1 w2=0 w3=0 (thereby emphasizing the front windshield perception);

If P(X)_road∈[60% 85%], then w1=0.9 w2=0.05 w3=0.0.5 (thereby scaling down the confidence or probability of the front windshield perception); and If P(X)_road<60%, then w1=0.8 w2=0 w3=0.2 (thereby scaling down further the confidence of the front windshield perception).

Thus, when P(X)_road>85%, the first front probability can be calculated as follows: P(rain)_front_fusion=w1*P(rain)_front+w2*P(rain)_rear+w3*P(rain)_road=1*0.92+0*0.9+0*0.91=0.92.

In one example, the method 210 further comprises fusing the front windshield perception, the rear windshield perception and the environment perception of the first combination of detection sources with the weighted voting module of the ECU 40 (FIG. 1) to define a first rear probability of the first windshield class. Moreover, the weighted voting module is arranged to fuse the front windshield perception, the rear windshield perception, and the environment perception of the first combination of detection sources. The fusion of the front windshield perception, the rear windshield perception, and the environment perception defines the first rear probability of the first windshield class.

In one example of fusing to define the first rear probability, the weighted voting module comprises a second equation as:

$$P(X)\_rear\_fusion = w1*P(X)\_front + w2*P(X)\_rear + w3*P(X)\_road,$$

where P(X)_rear_fusion is the first rear probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively. As demonstrated above, the magnitudes of w1, w2, and w3 are calibrated and may vary based on the environment perception generated by the CWP module.

Moreover, the method 210 may comprise determining the first front intensity and the first rear intensity of the first windshield class. The first front intensity and the first rear intensity are based on drop rate within an area of the front windshield 14. Moreover, the ECU 40 is arranged to determine the first front intensity and the first rear intensity of the first windshield class. The first front intensity is based on drop rate within an area of the front windshield 14. Moreover, the first rear intensity is based on drop rate within an area of the rear windshield 18. In one example, the ECU 40 is arranged to determine each of the first front intensity and the first rear intensity by applying a linear fitting equation as:

$$In(drop) = k1*V\_drop + k2*N\_drop$$

where In (drop) is normalized intensity, V_drop is drop rate, N_drop is the number of drops per area, and k1 and k2 are calibrated coefficients.

The method 210 then comprises a step 224 of activating the front wiper 16 when one of the first front probability is greater than a front threshold and the first front probability is greatest in magnitude of the at least one classification. The method 210 may then comprise activating the rear wiper 20 when one of the first rear probability is greater than a front threshold and the first front probability is greatest in magnitude of the at least one classification. As mentioned in the description of the system, the ECU 40 comprises an activation module arranged to activate the front wiper 16 when the first front probability is greater than a front threshold. Alternatively, the activation module is arranged to activate the front wiper 16 when the first front probability is greatest in magnitude of the at least one windshield classification. Moreover, the activation module is arranged to activate the rear wiper 20 when the first rear probability is greater than a rear threshold. Alternatively, the activation module is arranged to activate the rear wiper 20 when the first rear probability is greatest in magnitude of the at least one classification.

Furthermore, the method 210 may further comprise adjusting a speed of the front wiper 16 based on the first front intensity when the front wiper 16 is activated and adjusting a speed of the rear wiper 20 based on the first rear intensity when the rear wiper 20 is activated. As discussed previously, the ECU 40 is arranged to adjust a speed of the front wiper 16 based on the first front intensity when the front wiper 16 is activated. Additionally, the ECU 40 is arranged to adjust a speed of the rear wiper 20 based on the first rear intensity when the rear wiper 20 is activated. The speed of the front wiper 16 and rear wiper 20 may be adjusted by way of any suitable manner such as a rule-based algorithm without departing from the scope or spirit of the present disclosure.

In accordance with another aspect of the present disclosure, FIG. 4 depicts a flowchart of a method 310 of automatically activating a windshield wiper system of a vehicle 12 having a front windshield 14 with a front wiper 16 and a rear windshield 18 with a rear wiper 20. The method 310 of FIG. 4. is implemented by the system 10 of FIG. 1.

As shown, the method 310 comprises a step 312 of providing original information 24 for condition assessment and comprises a step 314 of assessing at least one windshield classification of road conditions with a condition assessment module based on the original information 24. The method 310 further comprises a step 316 of capturing a front image of the front windshield 14, a rear image of the rear windshield 18, and an environment image of the environment. Moreover, the method 310 further comprises a step 318 of classifying the front image, the rear image, and the environment image to the at least one windshield classification with a conditional windshield perception module defining a first windshield class.

In this example, the method 310 further comprises a step 320 of determining a front windshield perception, a rear windshield perception, and an environment perception of the first windshield class with the conditional windshield perception module to define a first combination of detection sources. The method 310 further comprises a step 322 of fusing the first combination of detection sources with a weighted voting module with respect to the front windshield perception, the rear windshield perception and the environment perception, defining a first front probability of the first windshield class.

In this example, the weighted voting module comprises a first equation as:

$$P(X)\_front\_fusion = w1*P(X)\_front + w2*P(X)\_rear + w3*P(X)\_road,$$

where P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

The method 310 further comprises a step 324 of fusing the front windshield perception, the rear windshield perception and the environment perception of the first combination of detection sources with the weighted voting module to defining a first rear probability of the first windshield class. The weighted voting module comprising a second equation as:

$$P(X)\_rear\_fusion = w1*P(X)\_front + w2*P(X)\_rear + w3*P(X)\_road,$$

where P(X)_rear_fusion is the first rear probability of the first windshield class (X).

Additionally, the method 310 further comprises a step 326 of activating the front wiper 16 when one of the first front probability is greater than a front threshold and the first front probability is greatest in magnitude of the at least one classification. Furthermore, the method 310 further comprises a step 328 of activating the rear wiper 20 when one of the first rear probability is greater than a rear threshold and the first rear probability is greatest in magnitude of the at least one classification.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of automatically activating a windshield wiper system of a vehicle having a front windshield having a front wiper and a rear windshield having a rear wiper, the method comprising:
    providing original information for condition assessment;
    assessing at least one windshield classification of road conditions with a condition assessment module based on the original information;
    capturing a front image of the front windshield, a rear image of the rear windshield, and an environment image of the environment;
    classifying the front image, the rear image, and the environment image to the at least one windshield classification with a conditional windshield perception module defining a first windshield class;
    determining a front windshield perception, a rear windshield perception, and an environment perception of the first windshield class with the Conditional windshield perception module to define a first combination of detection sources;
    fusing the front windshield perception, the rear windshield perception and the environment perception of the first combination of detection sources with a weighted voting module to define a first front probability of the first windshield class; and
    activating the front wiper when one of the first front probability is greater than a front threshold and the first front probability is greatest in magnitude of the at least one classification,
    wherein the weighted voting module comprises a first equation as $$P(X)\_front\_fusion = w1*P(X)\_front + w2*P(X)\_rear + w3*P(X)\_road,$$

where P(X)_front_fusion is the first front probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

2. The method of claim 1 wherein the original information comprises interior vehicle temperature, exterior vehicle temperature, local weather information, geographic climate, global positioning system (GPS) information of the vehicle for condition assessment.

3. The method of claim 1 wherein the at least one windshield classification is a road condition that may initiate activation of one of the front wiper and the rear wiper of the vehicle.

4. The method of claim 1 further comprising:
    estimating a first front intensity of the first windshield class with the Conditional windshield perception module;
    determining the first front intensity of the first windshield class, the first front intensity being based on drop rate within an area of the front windshield; and
    adjusting a speed of the front wiper based on the first front intensity when the front wiper is activated.

5. The method of claim 4 wherein determining the first front intensity comprises applying a linear fitting equation as $$\ln(drop) = k1*V\_drop + k2*N\_drop$$

where In (drop) is normalized intensity, V_drop is drop rate, N_drop is the number of drops per area, and k1 and k2 are calibrated coefficients.

6. The method of claim 1 further comprising:
    fusing the front windshield perception, the rear windshield perception and the environment perception of the first combination of detection sources with the weighted voting module to define a first rear probability of the first windshield class; and
    activating the rear wiper when one of the first rear probability is greater than a rear threshold and the first rear probability is greatest in magnitude of the at least one classification.

7. The method of claim 6 wherein the weighted voting module comprises a second equation as $$P(X)\_rear\_fusion = w1*P(X)\_front + w2*P(X)\_rear + w3*P(X)\_road,$$

where P(X)_rear_fusion is the first rear probability of the first windshield class (X), P(X)_front is the front windshield perception, P(X)_rear is the rear windshield perception, P(X)_road is the environment perception, and w1, w2, and w3 are weight of detection sources of the front windshield perception, the rear windshield perception, and the environment perception, respectively.

8. The method of claim 6 further comprising:
    estimating a first rear intensity of the first windshield class with the Conditional windshield perception module;
    determining the first rear intensity of the first windshield class, the first rear intensity being based on drop rate within an area of the rear windshield; and
    adjusting a speed of the rear wiper based on the first rear intensity when the rear wiper is activated.

9. The method of claim 8 wherein determining the first rear intensity comprises applying a linear fitting equation as $$\ln(drop) = k1*V\_drop + k2*N\_drop$$

where In (drop) is normalized intensity, V_drop is drop rate, N_drop is the number of drops per area of the rear windshield, and k1 and k2 are calibrated coefficients.

10. The method of claim 1 wherein the cloud server is arranged to provide processed information for system arbitration.

11. A system of automatically activating a windshield wiper of a vehicle, the vehicle comprising a front windshield having a front wiper and a rear windshield having a rear wiper, the system comprising:
- aba cloud server disposed remotely from the vehicle, the cloud server arranged to provide original information for condition assessment;
- at least one sensor disposed on the vehicle and arranged to capture a front image of the front windshield, a rear image of the rear windshield, and an environment image of the environment; and
- an electronic control unit (ECU) disposed in the vehicle, the ECU being in communication with the cloud server and the at least one sensor, the ECU comprising:
  - a condition assessment module arranged to assess at least one windshield classification of road conditions based on the original information;
  - a conditional windshield perception module arranged to classify the front image, the rear image, and the environment image to the at least one windshield classification defining a first windshield class, the Conditional windshield perception module being arranged to determine a front windshield perception, a rear windshield perception, and an environment perception of the first windshield class to define a first combination of detection sources;
  - a weighted voting module arranged to fuse the front windshield perception, the rear windshield perception and the environment perception of the first combination of detection sources, defining a first front probability of the first windshield class; and
  - an activation module arranged to activate the front wiper when one of the first front probability is greater than a front threshold and the first front probability is greatest in magnitude of the at least one windshield classification,
- wherein the weighted voting module comprises a first equation as $$P(X)\_front\_fusion = w1*P(X)\_front + w2*P(X)\_rear + w3*P(X)\_road,$$

where $P(X)\_front\_fusion$ is the first front probability of the first windshield class (X), $P(X)\_front$ is the front windshield perception, $P(X)\_rear$ is the rear windshield perception, $P(X)\_road$ is the environment perception, and w1, w2, and w3 are weight of detection sources of the front windshield perception, the rear windshield perception, and the environment perception, respectively.

12. The system of claim 11 wherein the original information comprises interior vehicle temperature, exterior vehicle temperature, local weather information, geographic climate, global positioning system (GPS) information of the vehicle for condition assessment.

13. The system of claim 11 wherein the Conditional windshield perception module is arranged to estimate a first front intensity of the first windshield class, wherein the ECU is arranged to determine the first front intensity of the first windshield class, the first front intensity being based on drop rate within an area of the front windshield and wherein the ECU is arranged to adjust a speed of the front wiper based on the first front intensity when the front wiper is activated.

14. The system of claim 13 wherein the ECU is arranged to determine the first front intensity comprises by applying a linear fitting equation as $$\ln(drop) = k1*V\_drop + k2*N\_drop$$

where ln (drop) is normalized intensity, V_drop is drop rate, N_drop is the number of drops per area, and k1 and k2 are calibrated coefficients.

15. The system of claim 11 wherein the weighted voting module is arranged to fuse the front windshield perception, the rear windshield perception and the environment perception of the first combination of detection sources to define a first rear probability of the first windshield class and wherein the activation module is arranged to activate the rear wiper when one of the first rear probability is greater than a rear threshold and the first rear probability is greatest in magnitude of the at least one classification.

16. The system of claim 15 wherein the weighted voting module comprises a second equation as $$P(X)\_rear\_fusion = w1*P(X)\_front + w2*P(X)\_rear + w3*P(X)\_road,$$

where $P(X)\_rear\_fusion$ is the first rear probability of the first windshield class (X), $P(X)\_front$ is the front windshield perception, $P(X)\_rear$ is the rear windshield perception, $P(X)\_road$ is the environment perception, and w1, w2, and w3 are weight of detection sources of the front windshield perception, the rear windshield perception, and the environment perception, respectively.

17. The system of claim 15 wherein the Conditional windshield perception module is arranged to estimate a first rear intensity of the first windshield class, wherein the ECU is arranged to determine the first rear intensity of the first windshield class, the first rear intensity being based on drop rate within an area of the rear windshield and wherein the ECU is arranged to adjust a speed of the rear wiper based on the first rear intensity when the rear wiper is activated.

18. The system of claim 17 wherein the ECU is arranged to determine the first rear intensity by applying a linear fitting equation as $$\ln(drop) = k1*V\_drop + k2*N\_drop$$

where ln (drop) is normalized intensity, V_drop is drop rate, N_drop is the number of drops per area of the rear windshield, and k1 and k2 are calibrated coefficients.

19. The system of claim 11 wherein the cloud server is arranged to provide processed information for system arbitration.

20. A method of automatically activating a windshield wiper system of a vehicle having a front windshield having a front wiper and a rear windshield having a rear wiper, the method comprising:
- providing original information for condition assessment;
- assessing at least one windshield classification of road conditions with a condition assessment module based on the original information;
- capturing a front image of the front windshield, a rear image of the rear windshield, and an environment image of the environment;
- classifying the front image, the rear image, and the environment image to the at least one windshield classification with a conditional windshield perception module defining a first windshield class;
- determining a front windshield perception, a rear windshield perception, and an environment perception of the first windshield class with the Conditional windshield perception module to define a first combination of detection sources;
- fusing the front windshield perception, the rear windshield perception and the environment perception of the first combination of detection sources with a weighted voting module to define a first front probability of the first windshield class, the weighted voting module comprising a first equation as $$P(X)\_front\_fusion = w1*P(X)\_front + w2*P(X)\_rear + w3*P(X)\_road,$$

where $P(X)\_front\_fusion$ is the first front probability of the first windshield class (X), $P(X)\_front$ is the front windshield perception, $P(X)\_rear$ is the rear windshield perception, $P(X)\_road$ is the environment perception, and w1, w2, and w3 are weight of detection sources of the front windshield perception, the rear windshield perception, and the environment perception, respectively;

fusing the front windshield perception, the rear windshield perception and the environment perception of the first combination of detection sources with the weighted voting module to define a first rear probability of the first windshield class, the weighted voting module comprising a second equation as $$P(X)\_rear\_fusion = w1*P(X)\_front + w2*P(X)\_rear + w3*P(X)\_road,$$

where $P(X)\_rear\_fusion$ is the first rear probability of the first windshield class (X);

activating the front wiper when one of the first front probability is greater than a front threshold and the first front probability is greatest in magnitude of the at least one classification; and activating the rear wiper when one of the first rear probability is greater than a rear threshold and the first rear probability is greatest in magnitude of the at least one classification.

* * * * *